United States Patent [19]
Mancebo

[11] 3,937,478
[45] Feb. 10, 1976

[54] COINING SEAL

[76] Inventor: Lloyd Mancebo, 856 Adams Ave., Livermore, Calif. 94550

[22] Filed: Nov. 18, 1974

[21] Appl. No.: 524,843

[52] U.S. Cl. ............... 277/171; 277/190; 277/236; 285/363
[51] Int. Cl.² ........................................... F16J 9/00
[58] Field of Search.................... 277/190, 236, 171; 285/363

[56] References Cited
UNITED STATES PATENTS

| | | | |
|---|---|---|---|
| 3,208,758 | 9/1965 | Carlson et al.................... | 277/236 X |
| 3,223,427 | 12/1965 | Gerard et al..................... | 277/190 X |
| 3,301,578 | 1/1967 | Platt et al. ....................... | 277/236 X |
| 3,747,963 | 7/1973 | Shivak .............................. | 285/363 |

Primary Examiner—Samuel B. Rothberg
Attorney, Agent, or Firm—Robert R. Tipton

[57] ABSTRACT

A bakeable high pressure-vacuum seal is provided in which an inductile sealing element having a butterfly shaped crosssection with protruding sharp edges at each of the four corners, is sandwiched between two ductile sealing elements, the sandwiched assembly then being compressed between the surfaces of the flange elements of a high pressure or high vacuum vessel to coin the ductile sealing element into the surface of the inductile sealing element as well as the surfaces of the flange elements.

6 Claims, 6 Drawing Figures

COINING SEAL

BACKGROUND OF THE INVENTION

This invention relates generally to high pressure-high vacuum seals and in particular to bakeable high pressure-high vacuum seals.

Basically, the high pressure-high vacuum seals of the prior art were of several configurations. One configuration employed a rectangular groove in one flange of the vessel in which an "O"-ring was placed and compressed. The "O"-ring was generally fabricated from an organic material which did not permit operation at high temperature.

Other configurations used a hard sealing element of circular cross-section surrounded by a softer material which was compressed between the surfaces of the vessel flanges, however, such gaskets were not sufficiently strong to withstand high pressure when employed without a containment groove.

A further configuration used a sealing element having a sharp knife edge that imbeds itself into each of the flanges to create a seal. Such a seal, of course, causes permanent damages to the flanges and cannot be subjected to high temperature or pressures because of the forces imposed upon the narrow thickness of the gasket at the knife edge.

SUMMARY OF THE INVENTION

To withstand high pressure-high vacuum at high temperatures, the coining seal of the present invention comprises an inductile sealing element having a sealing surface with sharp edge protrusions on each side sandwiched between a pair of ductile sealing elements, which combination is compressed at high pressure between the surfaces of a vessel flange to coin its sealing surface into the ductile sealing element as well as coin the ductile sealing element into any irregularities in the flange surfaces.

It is, therefore, an object of the present invention to provide a high pressure-high vacuum sealing device.

It is a further object of the present invention to provide a high pressure-high vacuum sealing device that is bakeable.

It is another object of the present invention to provide a high pressure-high vacuum sealing device that can withstand large variations in temperature recycling.

It is still a further object of the present invention to provide a high pressure-high vacuum sealing device for use between a flange having planar surfaces.

These and other objects of the present invention will be manifest upon study of the following detailed description when taken together with the drawing.

DESCRIPTION OF THE PREFERRED EMBODIMENT

Figure 1:
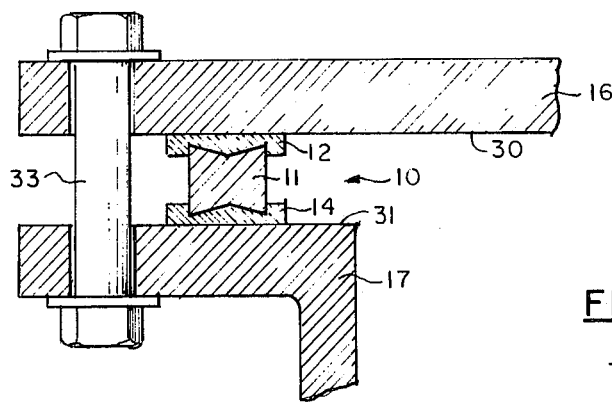
FIG. 1 is an elevational cross-sectional view of a typical coining seal of the present invention as it appears in its compressed state between the flanges of a pressure vessel.

With reference to FIG. 1, the coining seal 10 of the present invention comprises, basically, a first inductile sealing element 11 sandwiched between a second ductile sealing ductile sealing element 12 and a third ductile sealing element 14, with the assembled seal 10 compressed between vessel flanges 16 and 17.

Figure 2:
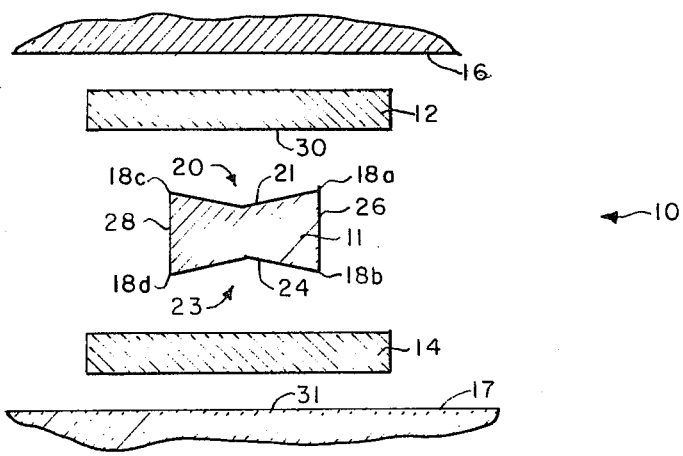
FIG. 2 is an exploded elevational cross-sectional view of the coining seal of FIG. 1.

A more detailed view of coining seal 10 of the present invention prior to compression is illustrated in the exploded view of FIG. 2 in which inductile sealing element 11 is shown in cross-section and defines a butterfly shape having sharp edges at the four outer corners, in particular inner sharp edges 18a and 18b, and outer sharp edges 18c and 18d. With reference to FIG. 2, first inductile sealing element 11 comprises a first sealing surface 20 in which a first groove 21 is disposed longitudinally along surface 20 with the outer edge of groove 21 defining inner sharp members 18a and outer edge members 18b. The designation "inner" and "outer" refers to the position of the section 2—2 of FIG. 3 and the area inside seal 10 to the right and outside seal 10 to the left.

In a like manner, on the opposite side of sealing element 11 is second sealing surface 23 in which a second groove 24 is disposed longitudinally along surface 23 to define inner sharp edge member 18b and and outer sharp edge member 18d.

It will be noted that inner surface 26 which defines one side of edge member 18a and 18b, respectively, facing away from sealing element 11, is arranged to be generally perpendicular to sealing elements 12 and 14 as is outer surface 28 which also defines one side of edge members 18c and 18d, respectively.

Figure 4:
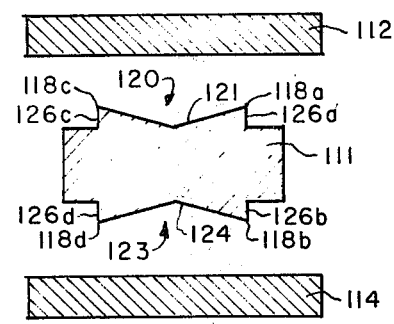
FIG. 4 is an exploded elevational cross-sectional view of a second embodiment of the coining seal of the present invention.

A second embodiment of the coining seal inductile member 110 of the present invention is illustrated in FIG. 4 comprising an inductile sealing element 111 having a first sealing surface 120 in which a first groove 121 is disposed longitudinally along surface 120 with the outer edges of groove 121 raised above surface 120 to define a pair of protruding sharp edge members 118a and 118c.

It will be noted that outward facing surfaces 126a and 126d of edge members 118a and 118c, respectively, are disposed generally perpendicular to first ductiles sealing element 112.

In a like manner on the opposite side of inductile member 111 of the embodiment illustrated in FIG. 4, is second sealing surface 123 in which a second groove 124 is disposed longitudinally along surface 123 with the outer edges of groove 124 raised above surface 123 to define a pair of protruding sharp edge members 118b and 118d.

Again it will be noted, in a manner similar to the side previously described, the outward facing surfaces 126b and 126d of edge members 118b and 118d, respectively, are disposed generally perpendicular to second ductile seal 114.

Figure 5:
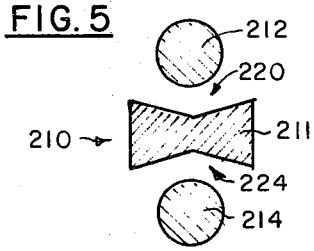
FIG. 5 is an exploded elevational cross-sectional view of a third embodiment of the coining seal of the present invention.

A third embodiment of the coining seal of the present invention is illustrated in FIG. 5 in which ductile sealing elements 212 and 214 define wires which are placed in grooves 220 and 224, respectively, of inductile sealing element 211.

Figure 6:
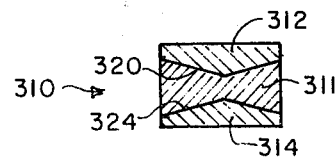
FIG. 6 is an exploded elevational cross-sectional view of a fourth embodiment of the coining seal of the present invention.

A fourth embodiment of the coining seal of the present invention is illustrated in FIG. 6 in which ductile sealing elements 312 and 314 are originally cast and electroformed into grooves 320 and 324, respectively, of inductile sealing element 311. As can be seen from the drawing, for both FIGS. 5 and 6, the volume of ductile sealing elements 212 and 214 (FIG. 5) and 312 and 314 (FIG. 6) if greater than the volume of grooves 220, 224 and 320 and 324, respectively, so that the sharp edges of the four corners of inductile sealing elements 211 and 311 do not come in contact with, but are spaced apart from flanges 30 and 31 as also, for example, illustrated in FIG. 1.

Figure 3:
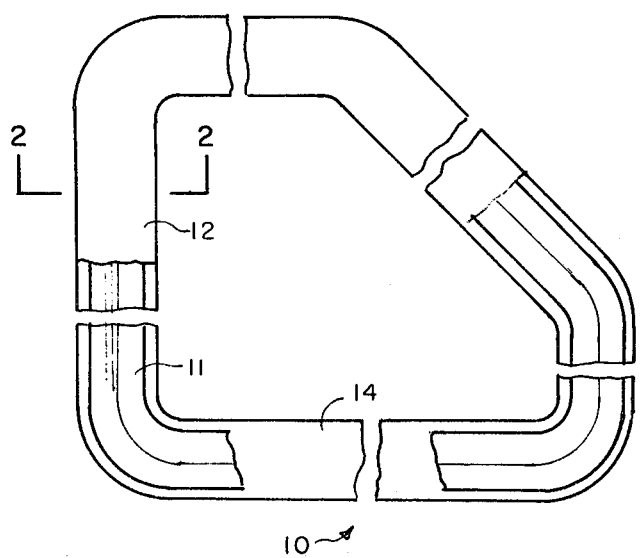
FIG. 3 is a plan view of a partial cut-away view of a typical coining seal of the present invention.

As can be seen from FIG. 3, inductile sealing element 10 can be of any shape with ductile sealing elements 12 and 14 adapted to match the shape of sealing element 11 but wider than element 11 to permit sharp edge members 18a, 18b, 18c, and 18d to be coined or embedded in ductile sealing elements 12 and 14 as shown in FIG. 1.

Sealing elements 12 and 14, as can be seen from FIG. 3, are initially flat strips of a ductile material.

A typical inductile sealing element 11 can be fabricated from any hard metal with successful results obtained using 316 stainless steel. An ordinary machine surface, typically 16–32 finish, has been found to perform satisfactorily.

The typical width of inductile sealing element 11 is 0.2 centimeters (cm) and a maximum thickness of about 0.2 cm. and with a thickness at the bottom of grooves 21 and 23 of approximately 0.125 cm. and a groove bottom angle of 139° which would result in a groove depth of about 0.037 cm.

Second and third ductile sealing elements 12 and 14 are fabricated from any relatively soft, with respect to stainless steel, material, typically copper. Soft aluminum will also perform satisfactorily although at a lower temperature.

For a coining seal using an inductile sealing element 11 of the demensions noted above, ductile sealing elements 12 and 14 would be typically 0.0381 cm. thick with a width of approximately 1.25 cm.

To install the coining seal 10 of the present invention, element 11, 12 and 14 are assembled as shown in FIG. 2 and compressed together between flanges 16 and 17 as shown in FIG. 1.

Flange bolts 33 are tightened to cause sufficient compressive force to be applied to seal assembly 10 to cold flow the ductile material of seals 12 and 14, into grooves 21 and 24 as well as any irregularities in surfaces 30 and 31 of flange members 16 and 17, respectively. Flanges 16 and 17, of course, must be thick enough so that they will not bend or warp during compression of coining seal assembly 10.

Typically, bolt pressures (force) along the seal will be about 3000 lbs per inch along the seal.

For a seal having a width of 0.2 cm., coining pressures would be of the order of 37,500 lb/sq. in. along the seal.

A typical flange using a 10 cm. diameter coining seal 10 should be about 2.54 cm. thick with 0.794 cm. bolts spaced 2.54 cm. center-to-center.

Such a seal configuration has been operated at 420° C for 250 hours at a vacuum of approximately $10^{-7}$ Torr without leakage including recycling to room temperature.

I claim:

1. A bakeable high pressure-vacuum seal to be compressed between two planar surfaces comprising
   a first generally inductile sealing element having a first sealing surface defining a first pair of protruding sharp edges and a second sealing surface defining a second pair of protruding sharp edges,
   a second generally ductile sealing element adapted to match the shape of said first sealing element and be compressed against said first sealing surface engaging both sharp edges of said first pair of protruding sharp edges, and
   a third generally ductile sealing element adapted to match the shape of said first sealing element and be compressed against said second sealing surface engaging both sharp edges of said second pair of protruding sharp edges,
   a second and third sealing elements being disposed between said two planar surfaces and compressed together thereby.

2. The bakeable high pressure-vacuum seal as claimed in claim 1 wherein said first pair of protruding sharp edges comprises
   first inner and first outer edge member,
   said second pair of protruding sharp edges comprises second inner and second outer edge members,
   said inner sharp edge members having their sides facing away from said first sealing element disposed generally perpendicular to said ductile sealing elements, and
   said outer sharp edge members having their sides facing away from said first sealing element disposed generally perpendicular to said ductile sealing elements.

3. The bakeable high pressure-vacuum seal as claimed in Claim 1 wherein
   the cross-section through said first sealing element taken from the high pressure to low pressure side is butterfly shaped having sharp edges at the four outer corners.

4. A bakeable high pressure-vacuum seal adapted to be compressed between two planar surfaces comprising
   a first generally inductile sealing element having first and second sealing surfaces disposed on opposite sides of said first sealing element
   means defining a first groove having its two outer edges defining generally equal height protruding sharp edges disposed longitudinally along said first sealing surface,
   means defining a second groove having its two outer edges defining generally equal height protruding sharp edges disposed longitudinally along said second sealing surface,
   a second generally ductile sealing element adapted to match the shape of said first sealing element and be compressed against said first sealing surface the volume of said second sealing element being greater than the volume of said first groove,
   a third generally ductile sealing element adapted to match the shape of said first sealing element and be compressed against said second sealing surface the volume of said third sealing element being greater than the volume of said second groove,
   said three sealing elements being disposed between said two planar surfaces and compressed together whereby said protruding sharp edges are spaced apart from said planar surfaces.

5. The bakeable high pressure-vacuum seal as claimed in claim 4 wherein
said first and second grooves define V-shaped grooves having a pair of protruding sharp edges.
6. The bakeable high pressure-vacuum seal as claimed in claim 5 wherein said pair of protruding sharp edges comprise
inner and outer sharp edge members,
said inner sharp edge members having their sides facing away from said first sealing element disposed generally prependicular to said second and third sealing elements.
said outer sharp edge members having their sides facing away from said first sealing element disposed generally perpendicular to said second and third sealing elements.

* * * * *